United States Patent [19]

Tachibana et al.

[11] 4,035,563

[45] July 12, 1977

[54] METHOD OF SUSPENSION POLYMERIZING VINYL CHLORIDE WITH SALTS OF NITROUS ACIDS AND POLYVALENT METAL SALTS

[75] Inventors: Hiromitsu Tachibana; Toshiaki Sasaki; Toshiaki Sugita, all of Takasago; Kazuo Saito, Nishinomiya, all of Japan

[73] Assignee: Kanegafuchi Kagaku Kogyo Kabushiki Kaisha, Osaka, Japan

[21] Appl. No.: 557,830

[22] Filed: Mar. 12, 1975

[30] Foreign Application Priority Data

Mar. 26, 1974 Japan .............................. 49-34142
June 20, 1974 Japan .............................. 49-70923

[51] Int. Cl.² .................. C08F 1/00; C08F 1/80
[52] U.S. Cl. .................................. 526/199; 526/4; 526/200; 526/201; 526/202; 526/217; 526/233; 526/234; 526/238; 526/344

[58] Field of Search .......... 526/199, 200, 201, 202, 526/344

[56] References Cited

U.S. PATENT DOCUMENTS

| | | | |
|---|---|---|---|
| 3,205,204 | 9/1965 | Heckmaier | 260/87.1 |
| 3,418,300 | 12/1968 | Nakajima | 260/85.5 |
| 3,691,080 | 9/1972 | Bauer | 260/78.5 CL |
| 3,706,705 | 12/1972 | Koyanagi | 260/78.5 CL |
| 3,817,959 | 6/1974 | Balwé | 526/200 |

Primary Examiner—Christopher A. Henderson
Attorney, Agent, or Firm—Moonray Kojima

[57] ABSTRACT

A method of suspension polymerizing in an aqueous medium vinyl chloride or a mixture of 50% or more vinyl chloride and remainder other monomers copolymerizable therewith in the presence of an oil soluble initiator, a suspension stabilizer and 0.005 to 50 ppm of nitrite, and 10 to 1000 ppm of water soluble metallic salt, the parts being based on the amount of aqueous medium.

6 Claims, No Drawings

METHOD OF SUSPENSION POLYMERIZING VINYL CHLORIDE WITH SALTS OF NITROUS ACIDS AND POLYVALENT METAL SALTS

BACKGROUND OF THE INVENTION

The present invention relates to an improved method of suspension polymerising vinyl chloride or a mixture of a major proportion of vinyl chloride and remainder other monomers copolymerizable therewith, in an aqueous medium, in the presence of an oil soluble polymerization initiator and suspension stabilizer. More particularly, the invention relates to such a method which substantially reduces or eliminates the adhesion of polymeric dreg substance (hereinafter called sometimes scale) to the inner wall of a polymerization vessel used in the suspension polymerization.

In case of suspension polymerization of vinyl chloride or mixture of vinyl chloride and other monomers co-polymerizable therewith, in an aqueous medium and in the presence of an oil soluble polymerization initiator, scales adhere to the inner wall of the reaction vessel, to the wings of the agitator, to the shaft of the agitator and to the interfering plates, etc. This decreases the yield of polymer and the cooling ability of the reaction vessel and decreases the property of the obtained product since the scale peeled off from the surfaces mentioned above may become mixed into the product. Moreover, such deficiency decreases the operation usage of the reaction vessel since substantial time and labor are required to remove the adhered scales. These disadvantages have always existed in conventional suspension polymerization methods of polymerizing vinyl chloride in an aqueous medium.

SUMMARY OF THE INVENTION

An object of the invention is to substantially reduce or eliminate the above deficiencies of the prior art.

A further object of the invention is to reduce scaling in suspension polymerization of vinyl chloride or mixture of 50% or more vinyl chloride and remainder other monomers copolymerizable therewith.

The foregoing and other objects of the invention are attained in the invention, which encompasses a method of suspension polymerization of vinyl chloride or a mixture containing 50% or more of vinyl chloride and remainder other monomers copolymerizable therewith (herein the term "vinyl chloride" may be used to refer to both vinyl chloride and such mixtures of vinyl chloride and other monomers), in an aqueous medium, in the presence of suspension agent, oil soluble polymerization initiator, 0.005 to 50 ppm (more preferably 0.01 to 10 ppm) of nitrite and 10 to 1000 ppm water soluble metallic salt or preferably a water soluble polyvalent metallic salt of at least 3 valence. The ppm (parts per million) is based upon the amount of aqueous medium. Advantageously, by such foregoing method, scales are prevented from forming during suspension polymerization of the vinyl chloride.

A feature of the invention is the use in a suspension polymerization of vinyl chloride or mixture of a major proportion of vinyl chloride and remainder monomers copolymerizable therewith, of 0.005 to 50 ppm, and more preferably 0.01 to 10 ppm, of nitrite and 10 to 1000 ppm water soluble metallic salt.

A further feature of the invention is the use in such method of a suspension stabilizing agent, an oilsoluble initiator and water soluble polyvalent metallic salt of at least 3 valence.

DETAILED DESCRIPTION OF PREFERRED EMBODIMENT

In regard to the nitrite, if less than 0.005 ppm, is used, prevention of scale formation is not sufficient. If the amount of nitrite is more than 50 ppm, its effect in preventing scale formation is barely improved. Moveover, use of such excess amounts of nitrite causes decrease in polymerization velocity. If less than 10 ppm of water soluble metallic salt is used, scale formation is not sufficiently prevented. If more than 1000 ppm is used, further increases in prevention of scale formation is scarcely recognizable. Such excess amounts also produce certain decreases in properties of the obtained product. Thus the foregoing ranges must be employed in the invention to attain optimal results.

Examples of nitrites which may be used in the invention are inorganic and organic salts of nitrous acid, such as sodium nitrite potassium nitrite, calcium nitrite, etc as the inorganic salts; and dicyclohexyl amine nitrous acid salt, triethyl amine nitrous acid salt, etc, as the organic salts. They may be used singly or as a mixture of more than one kind of them.

Examples of water soluble metallic salts which may be used are sulphates, nitrates, sulphites, phosphates and halogen acid salts of various metals and more preferably those salts of polyvalent metals of at least 3 valence. Preferred examples are potassium chloride, calcium chloride, titanium trichloride, aluminum sulphate, stannic chloride, ferric chloride, alums, ferrous nitrate, etc. They may be used singly or in combination of two or more.

Examples of monomers which may be used to copolymerize with vinyl chloride are vinylidene chloride, ethylene, propylene, vinyl acetate, etc and mixtures of the foregoing. However, other monomers which can copolymerize with vinyl chloride may be used. As the dispersion agent (also called suspension stabilizing agent) used in the present invention, natural or synthetic high polymer or inorganic dispersion agent, can be used, such as partially saponified polyvinyl acetate, polyacrylic acid, cellulose derivatives, starch, gelatin tricalcium phosphate, etc. Of course may other suspension agents can also be used. As the polymerization initiator there can be used peroxides, such as benzoyl peroxide, lauroyl peroxide, tert-butyl peroxyl-bivalerate, diisopropyl peroxydicarbonate, diethoxyethyl peroxydicarbonate, etc; azo compounds such as azo-bis-isobutylonitrile, azo-bis-dimethyl valero nitrile and other free radical generators; and generally without any special limitation.

Advantageously, when the inventive suspension polymerization is carried out with any one or more of the above mentioned water soluble metallic salt and one or more of the abovementioned nitrites added to the aqueous medium, it is possible to carry out the suspension polymerization without the added step of removing the scales, as is necessary in the prior art. On the other hand, without the addition of the nitrite and water soluble metallic salt, such scale removal would be necessary after each polymerization operation.

It was discovered by the inventors, that although scale formation can be prevented to at least a slight degree by use of only nitrite, scale prevention is more effective when a combination of nitrite and water soluble metallic salt, in the amounts above mentioned, is used in the present inventive method. Moreover, it was discovered by the inventors that adding only water soluble metallic salt has scarcely any effect in prevention of scale formation. But the addition of both nitrite and water soluble metallic salt in the amounts recited, through a synergistic effect, advantageously produces the outstanding and surprising effect of scale prevention. Furthermore, the inventors have discovered that in the polymerization system containing both nitrite and water soluble metallic salt, a system which contains water soluble polyvalent metallic salt having at least 3 valence, is more effective in preventing scale formation than a system which contains a water soluble metallic salt of at most 2 valence.

By the method of the present invention, it is possible to obtain a final formed product having little or no fish eyes, without adversely affecting apparent volume density (so called tapping weight) of the obtained polymer powder, or adversely affecting transparency and thermal stability of the final formed product. Therefore, the inventive method produces a substantial advance in the art, without in any way detracting from the properties of the final product.

The invention will be described in more detail hereinbelow with reference to actual examples, which examples are illustrative of the inventive principles and are not to be construed in any limiting sense.

EXAMPLES 1–4 and COMPARATIVE EXAMPLE 1

At first, 400 grams of a partially saponified polyvinyl acetate, 90 grams of azo-bis-dimethyl valero nitrile and 800 kilograms of water were charged into a stainless steel polymerization reaction vessel of 1500 liter inner capacity; then sodium nitrite and aluminum sulphate were added to it in amounts shown in Table 1. After degassing, 400 kilograms of vinyl chloride was charged into the reaction vessel and polymerization was carried out at 57° C for 9 hours. The obtained results are shown in Table 1.

TABLE 1

|  | Ex. 1 | Ex. 2 | Ex. 3 | Ex. 4 | Comp. Ex. 1 |
|---|---|---|---|---|---|
| Amount of sodium nitrite (ppm to water) | 0.005 | 0.01 | 10 | 50 | none |
| Amount of aluminum sulphate (ppm to water) | 500 | 500 | 50 | 50 | none |
| Amount of scale (g/m$^2$) | 0 | 0 | 0 | 0 | 160 |
| Yield of polymer (%) | 82 | 81 | 77 | 75 | 82 |
| Number of fish eyes (number/10 × 10 cm$^2$)* | 10 | 9 | 9 | 10 | 60 |

*The number of fish eyes was observed by the naked eye on every sheet, by transmitting a light through it and recording the number per 10 × 10 cm$^2$ of area of the sheet. The sheet was prepared from a blend of the mixture shown in Table 2, after mixing for 8 minutes using a mixing roll at 140° C.

TABLE 2

| Composition | Parts | Composition | Parts |
|---|---|---|---|
| Polymer | 100 | Stearic acid | 0.5 |
| Dioctyl phthalate | 50 | titanium oxide | 0.4 |
| Tribasic lead sulphate | 3 | Carbon black | 0.02 |

EXAMPLES 5–10 and COMPARATIVE EXAMPLES 2–3

First, 800 kilogram of water containing 400 grams of methyl cellulose dissolved therein, 50 kilograms of vinyl acetate, 1 kilogram of trichloro ethylene and 120 grams of azo-bis-dimethyl valernonitrile were charged into a polymerization reaction vessel of 1,500 liter inner capacity, and then 350 kilogram of vinyl chloride was charged further after degassing. Adding ammonium nitrite and aluminum chloride in the amounts shown in Table 3, polymerization was carried out at 60° C for 10 hours. Polymerization procedure were repeated continuously for ten times using the same composition and same conditions for polymerization and the effects in preventing scale formation were observed and results are shown in Table 3.

From Table 3, it is clear that the use of water-soluble metallic salt together with nitrite substantially increases the prevention of scale formation.

EXAMPLES 11–14 and COMPARATIVE EXAMPLES 4–5.

First, 800 kilograms of water containing 350 grams of a partially saponified polyvinyl acetate dissolved therein, 3 kilograms of n-hexane, a catalyst for polymerization, 0.8 gram (1.0 ppm to water) of potassium nitrite and 80 grams (100 ppm to water) of a water soluble metallic salt of the type shown in Table 4, were charged into a stainless steel polymerization reaction vessel of 1500 liter inner capacity; then 500 kilogram of vinyl chloride was charged into the vessel after degassing, and polymerization was carried out at 60° C for 8 hours. Polymerization procedures were continuously repeated for many times using the same composition and same conditions to determine the effect of preventing of scale formation. The observed results are shown in Table 4. The catalyst or initiator used was 100 grams azo-bis-dimethyl valeronitrile (ABVN) or 75 grams of diisopropyl peroxydicarbonate (IPP).

From Table 4, it is clear that for prevention of scale formation, aluminum sulphate is much more effective than use of calcium chloride as water soluble metallic salt. The invention encompasses all such water soluble metallic salt, however.

TABLE 3

|  | Ex. 5 | Ex. 6 | Ex. 7 | Ex. 8 | Ex. 9 | Ex. 10 | Comp. Ex. 2 | Comp. Ex. 3 |
|---|---|---|---|---|---|---|---|---|
| Ammonium nitrite (ppm to water) | 0.005 | 0.01 | 0.1 | 0.7 | 10 | 10 | 0.01 | — |
| Aluminum chloride (ppm to water) | 1000 | 1000 | 500 | 100 | 10 | 1000 | — | — |
| Amount of scales (g/m$^2$) | | | | | | | | |
| After the first polymerization procedure | 0 | 0 | 0 | 0 | 0 | 0 | 5 | 170 |
| After continuous 4 times of polymerization procedure | 0 | 0 | 0 | 0 | 0 | 0 | — | — |
| After continuous 5 times of polymerization procedure | 0 | 0 | 0 | 0 | 0 | 0 | — | — |
| After continuous 10 times of polymerization procedure | 0 | 0 | 0 | 0 | 0 | 0 | — | — |

TABLE 4

|  | Ex. 11 | Ex. 12 | Ex. 13 | Ex. 14 | Comp. Ex. 4 | Comp. Ex. 5 |
| --- | --- | --- | --- | --- | --- | --- |
| Polymerization catalyst | ABVN | ABVN | IPP | IPP | ABVN | IPP |
| Water soluble metallic salt | CaCl$_2$ added | Al$_2$(SO$_4$)$_3$ added | CaCl$_2$ added | Al$_2$(SO$_4$)$_3$ added | — none | — none |
| Potassium nitrite | added | added | added | added | none | none |
| Amount of scales (g/m$^2$) |  |  |  |  |  |  |
| After the first time of polymerization procedure | 0 | 0 | 0 | 0 | 170 | 190 |
| After continuous 2 times of polymerization procedure | 0 | 0 | 0 | 0 | — | — |
| After continuous 3 times of polymerization procedure | 0 | 0 | 50 | 0 | — | — |
| After continuous 4 times of polymerization procedure | 0 | 0 | — | 0 | — | — |
| After continuous 5 times of polymerization procedure | 60 | 0 | — | 0 | — | — |
| After continuous 10 times of polymerization procedure | — | 0 | — | 0 | — | — |

EXAMPLES 15–22 and COMPARATIVE EXAMPLES 6–10

First, 800 kilograms of water containing 350 grams of a partially saponified polyvinyl acetate dissolved therein, 100 grams of azo-bis-dimethyl valeronitrile, 400 grams of methyl alcohol, 0.8 gram (1.0 ppm to water) of calcium nitrite and 80 grams (100 ppm to water) of a water soluble metallic salt shown in Table 5 were charged into a stainless steel polymerization reaction vessel of 1500 liter inner capacity. Then 500 kilogram of vinyl chloride was charged into the vessel after degassing and polymerization was carried out for 8 hours at 60° C. Polymerization procedures were continuously repeated until the scales began to form. The repeated number of polymerization procedures until scales began to form are shown in Table 5 for each water soluble metallic salt used.

TABLE 5

|  | metallic salt added | Repeated number of polymerization procedures |
| --- | --- | --- |
| Ex. 15 | Potassium carbonate | 3 |
| Ex. 16 | Calcium phosphate | 4 |
| Ex. 17 | Calcium carbonate | 5 |
| Ex. 18 | Ferrous chloride | 4 |
| Ex. 19 | Stannic chloride | 10 |
| Ex. 20 | Titanium trichloride | 10 |
| Ex. 21 | Titanium tetrachloride | 10 |
| Ex. 22 | Antimony pentachloride | 10 |
| Comp. Ex. 6 | metallic salt was not added | 2 |
| Comp. Ex. 7 | both metallic salt, nitrite was not added | 1 |
| Comp. Ex. 8 | stannic chloride; no nitrite added | 1 |
| Comp. Ex. 9 | titanium trichloride; no nitrite added | 1 |
| Comp. Ex. 10 | antimony pentachloride; no nitrite added | 1 |

From Table 5, it is clear that the effect of preventing scale formation for metallic salts whose valence is at most 2, together with nitrite is superior to that of use of nitrite only (Comp. Ex. 6). However, the effect in case of use of metallic salt of valence at least 3, together with nitrite, is very much superior to that of use of nitrite alone. This proves the superiority of metallic salt of 3 valence for prevention of scale formation, when used together with a nitrite.

EXAMPLES 23–24 and COMPARATIVE EXAMPLES 11–15

First, 800 kilograms of water containing 350 grams of a partially saponified polyvinyl acetate dissolved therein, 100 grams of azo-bis-dimethyl valeronitrile, sodium nitrite and aluminum sulphate were charged into a stainless steel polymerization reaction vessel of 1500 liter capacity, Then, 500 kilograms of vinyl chloride were charged into the vessel after degassing and polymerization was carried out for 8 hours at 60° C. Polymerization procedures were continually repeated using the same conditions and same components, until the scales began to form. Results are shown in Table 6.

From Table 6, it is understood that using only water soluble three valent metallic salt has no effect on the prevention of scale formation and the use of water soluble three valent metallic salt together with nitrite has superior and unexpected effects in preventing scale formation much better than using only nitrite in a large amount (Comp. Ex. 15).

TABLE 6

|  | Comp. Ex. 11 | Ex. 23 | Ex. 24 | Comp. Ex. 12 | Comp. Ex. 13 | Comp. Ex. 14 | Comp. Ex. 15 |
| --- | --- | --- | --- | --- | --- | --- | --- |
| Sodium nitrite (ppm to water) | — | 1 | 10 | 1 | 10 | 50 | 100 |
| Aluminum sulphate (ppm to water) | 500 | 500 | 50 | — | — | — | — |
| Amount of scale (g/m$^2$) |  |  |  |  |  |  |  |
| After the first time of polymerization procedure | 180 | 0 | 0 | 0 | 0 | 0 | 0 |
| After continuous 2 times of polymerization procedure | — | 0 | 0 | 0 | 0 | 0 | 0 |
| After continuous 3 times of polymerization procedure | — | 0 | 0 | 50 | 40 | 10 | 5 |
| After continuous 4 times of polymerization procedure | — | 0 | 0 | — | — | — | — |
| After continuous 5 times of polymerization procedure | — | 0 | 0 | — | — | — | — |
| After continuous 10 times of polymerization procedure | — | 0 | 0 | — | — | — | — |

The foregoing description is illustrative of the principles of the invention. Numerous other modifications and variations thereof would be apparent to the worker skilled in the art. All such modifications and variations are to be considered to be within the spirit and scope of the invention.

What is claimed is:

1. A method of suspension polymerizing vinyl chloride or a monomer mixture comprising a major portion of vinyl chloride, in an aqueous medium, in the presence of components consisting essentially of an oil soluble polymerization initiator, suspension stabilizing agent, and 0.005 to 50 ppm of a nitrite selected from the group consisting of sodium nitrite, potassium nitrite, calcium nitrite, and ammonium nitrite and 10 to 1000 ppm of a water soluble metallic salt selected from the group consisting of aluminum sulphate, aluminum chloride, stannic chloride, titanium trichloride, titanium tetrachloride and antimony pentachloride, said ppm being based on the amount of said aqueous medium.

2. The method of claim 1, wherein said nitrite comprises 0.01 to 10 ppm.

3. The method of claim 1, wherein said suspension polymerization is of a mixture of vinyl chloride and a monomer selected from the group consisting of vinylidene chloride, ethylene, propylene, vinyl acetate, and mixtures thereof.

4. The method of claim 1, wherein said initiator is selected from the group consisting of benzoyl peroxide, lauroyl peroxide, tert-butyl peroxyl-bivalerate, diisopropyl peroxydicarbonate, diethoxyethyl peroxydicarbonate, azo-bis-isobutylonitrile, azo-bis-dimethyl valeronitrile, and mixtures thereof.

5. The method of claim 1, wherein said suspension agent is selected from the group consisting of partially saponified polyvinyl alcohol, polyacrylic acid, cellulose derivatives, starch, gelatin, tricalcium phosphate, and mixtures thereof.

6. The method of claim 1, wherein said nitrite is $NaNO_2$, and said polyvalent salt is $Al_2(SO_4)_3$.

* * * * *